United States Patent
Fonts et al.

(10) Patent No.: US 12,000,307 B2
(45) Date of Patent: Jun. 4, 2024

(54) BLADE FOR A TURBINE ENGINE, AND ASSOCIATED TURBINE ENGINE

(71) Applicant: SAFRAN HELICOPTER ENGINES, Bordes (FR)

(72) Inventors: Pierre-Marie Fonts, Moissy-Cramayel (FR); Marc Maurice Dijoud, Moissy-Cramayel (FR); Hélène Clech, Moissy-Cramayel (FR); Michel Nin, Moissy-Cramayel (FR); Lorenzo Huacan Hernandez, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 43 days.

(21) Appl. No.: 17/763,027

(22) PCT Filed: Sep. 23, 2020

(86) PCT No.: PCT/EP2020/076620
§ 371 (c)(1),
(2) Date: Mar. 23, 2022

(87) PCT Pub. No.: WO2021/058599
PCT Pub. Date: Apr. 1, 2021

(65) Prior Publication Data
US 2022/0341336 A1 Oct. 27, 2022

(30) Foreign Application Priority Data
Sep. 24, 2019 (FR) ...................................... 1910503

(51) Int. Cl.
*F01D 5/28* (2006.01)
*F01D 5/14* (2006.01)

(52) U.S. Cl.
CPC ............. *F01D 5/288* (2013.01); *F01D 5/143* (2013.01); *F05D 2240/80* (2013.01)

(58) Field of Classification Search
CPC ...... F01D 5/288; F01D 5/143; F05D 2240/80; Y02T 50/60
See application file for complete search history.

(56) References Cited

U.S. PATENT DOCUMENTS

| 10,767,501 B2* | 9/2020 | Weber ..................... F01D 5/041 |
| 2007/0148003 A1* | 6/2007 | Trishkin .................. F01D 5/288 |
| | | 416/241 R |

(Continued)

FOREIGN PATENT DOCUMENTS

EP    1 980 713 A2    10/2008

OTHER PUBLICATIONS

International Search Report dated Nov. 16, 2020, issued in corresponding International Application No. PCT/EP2020/076620, filed Sep. 23, 2020, 6 pages.

(Continued)

*Primary Examiner* — Aaron R Eastman
(74) *Attorney, Agent, or Firm* — CHRISTENSEN O'CONNOR JOHNSON KINDNESS PLLC

(57) ABSTRACT

A blade for a turbine engine includes an aerodynamic airfoil extending radially outwards, a blade tip, a blade root, and a platform connected to the root by an upper end. A maximum radial distance between the blade tip and the platform defines a maximum extent of the bearing surface of the airfoil. The blade is partially covered by a protective strip to combat oxidation and corrosion. The strip extends between a lower limit situated on at least one portion of the platform and an upper limit situated on the blade root. The blade tip is not covered by the protective strip.

8 Claims, 3 Drawing Sheets

(56) References Cited

U.S. PATENT DOCUMENTS

| | | | | |
|---|---|---|---|---|
| 2011/0038710 | A1* | 2/2011 | Kemppainen | C23C 4/01 |
| | | | | 415/177 |
| 2012/0082559 | A1* | 4/2012 | Guglielmin | F01D 25/162 |
| | | | | 29/889.7 |
| 2013/0230406 | A1* | 9/2013 | Wilkins | F01D 5/286 |
| | | | | 416/241 R |
| 2015/0204347 | A1* | 7/2015 | Strock | F01D 11/122 |
| | | | | 156/60 |
| 2021/0054744 | A1* | 2/2021 | Task | C23C 28/021 |
| 2021/0189884 | A1* | 6/2021 | Weisse | F01D 5/20 |
| 2023/0192556 | A1* | 6/2023 | Colby | B32B 18/00 |
| | | | | 501/88 |

OTHER PUBLICATIONS

Written Opinion dated Nov. 16, 2020, issued in corresponding International Application No. PCT/EP2020/076620, filed Sep. 23, 2020, 5 pages.

English translation of Written Opinion dated Nov. 16, 2020, issued in corresponding International Application No. PCT/EP2020/076620, filed Sep. 23, 2020, 5 pages.

International Preliminary Report on Patentability dated Mar. 15, 2022, issued in corresponding International Application No. PCT/EP2020/076620, filed Sep. 23, 2020, 6 pages.

\* cited by examiner

BLADE FOR A TURBINE ENGINE, AND ASSOCIATED TURBINE ENGINE

FIELD OF THE DISCLOSURE

The present disclosure relates to the field of turbine engines, such as a gas turbine for example of an aircraft.

More particularly, the present disclosure relates to the protection of gas turbine airfoils against damage caused by oxidation and/or corrosion, and this, particularly in critical areas of the airfoil. "Critical area" means an area of the airfoil wherein any damage may functionally impact the airfoil. The most feared functional impact relates to the reduction of the life of the airfoil during vibration or thermomechanical fatigue produced by oxidation and corrosion in the areas of the airfoil where the stresses are high. Generally, the areas of high stress are situated in the root of the airfoil, close to the platform.

BACKGROUND

Many solutions exist in order to protect gas turbine airfoils against oxidation and/or corrosion. The material of the airfoil may, for example, be replaced with a material having a better oxidation resistance. Such a solution considerably increases the price of the airfoil and its implementation life is related to the development of a new foundry tool.

The complete profile of the airfoil may, for example, be entirely and homogeneously covered by a material having a better oxidation and corrosion resistance. Such a solution reduces the creep life of the airfoil by an addition of bulk in the tip and in the middle of the profile. The generalised increase of bulk also increases the stresses in the lower portion of the profile and reduces its vibration or thermomechanical fatigue resistance. The coating at the top of the airfoil may also creep and create undesired touching between rotor and stator. The performance of the engine is affected by this extra bulk.

Thus, there is a need to effectively protect the airfoil of a gas turbine to limit the related functional impacts, while making possible an application that is rapid and at lower cost.

SUMMARY

The aim of the present disclosure is therefore to overcome the aforementioned drawbacks.

The objective of the disclosure is therefore to make possible an effective protection of a turbine engine blade to combat corrosion and oxidation, without impacting the performances of the engine.

One object of the disclosure is therefore a blade for a turbine engine comprising an aerodynamic airfoil extending radially outwards, a blade tip, a blade root, and a platform connected to the root by an upper end. The maximum radial distance between the blade tip and the platform defines a maximum extent of the bearing surface of the airfoil.

The blade is partially covered by a protective strip to combat oxidation and corrosion, the strip extending between a lower limit situated on at least one portion of the platform and an upper limit situated on the blade root.

In other terms, the protective strip covers the blade only at its significantly stressed inner radial end. The outer radial end of the blade is therefore not covered. Thus, nuisances related to the presence of a coating on the outer radial end of the blade are prevented, particularly in terms of bulk, of increase of stresses, of coating creep, etc., while improving the thermomechanical and fatigue life of the inner radial end of the airfoil.

The radial distance between the limits defines the height of the protective strip.

Advantageously, the lower limit is situated at a lower end of the platform, radially opposite the upper end.

Advantageously, the upper limit is situated between a first radial distance and a second radial distance.

The first radial distance corresponds to a distance between the connection of the blade root to the platform and a first area situated on the root, and the second distance corresponds to a distance between the connection of the blade root to the platform and a second area situated on the root.

The second area corresponds to a creep limiting area.

"Creep limiting" area means an area combining a mechanical stress and a thermal level such that the airfoil will degrade (or will age) preferably during creep in this area. This area is conventionally close to the middle of the profile. The creep limiting area may be determined, for example, by testing on the component, or by elasto-plastic calculations over the entire airfoil to highlight the areas that would deform the most under the effect of stresses, temperatures and application times of these exposures, or for example, by the Larson-Miller relation linking over the entire airfoil stresses, temperatures and rupture lives for a given material, the creep limiting area being, for example, the area between once and twice the minimum life.

For example, the first radial distance is greater than or equal to 5 mm. In this case, the upper limit is situated at 5 mm from the connection of the blade root to the platform.

For example, the second radial distance is less than or equal to 50% of the maximum extent of the bearing surface of the airfoil, for example less than or equal to 40% of the maximum extent of the bearing surface of the airfoil. In this case, the upper limit is situated at a distance from the connection of the blade root to the platform less than or equal to 50% of the maximum extent of the bearing surface of the airfoil, for example less than or equal to 40% of the maximum extent of the bearing surface of the airfoil.

According to one embodiment, the protective strip comprises at least one area of constant coating thickness.

According to one embodiment, the protective strip comprises an upper transition area extending radially between the portion of airfoil devoid of coating and the area of the protective strip of constant coating thickness.

For example, the protective strip is applied upstream of a deposit of a coating forming a thermal barrier.

The protective strip is, preferably, made of material selected at least from the group comprising aluminum, iron, nickel, cobalt, yttrium, rare earths or precious metals.

According to a second aspect, the disclosure relates to a turbine engine comprising a plurality of blades such as described above.

DESCRIPTION OF THE DRAWINGS

Other aims, features and advantages of the disclosure will become apparent upon reading the following description, given only by way of non-limiting example, and made with reference to the indexed drawings wherein.

In the remainder of the description, the terms "upstream" and "downstream" are defined in relation to the direction of circulation of the air in the turbine engine. The terms "interior" and "exterior" are defined in relation to a radial direction to the main longitudinal X-X axis of the blade, the interior being closer to the main axis than the exterior.

DETAILED DESCRIPTION

Figure 1:
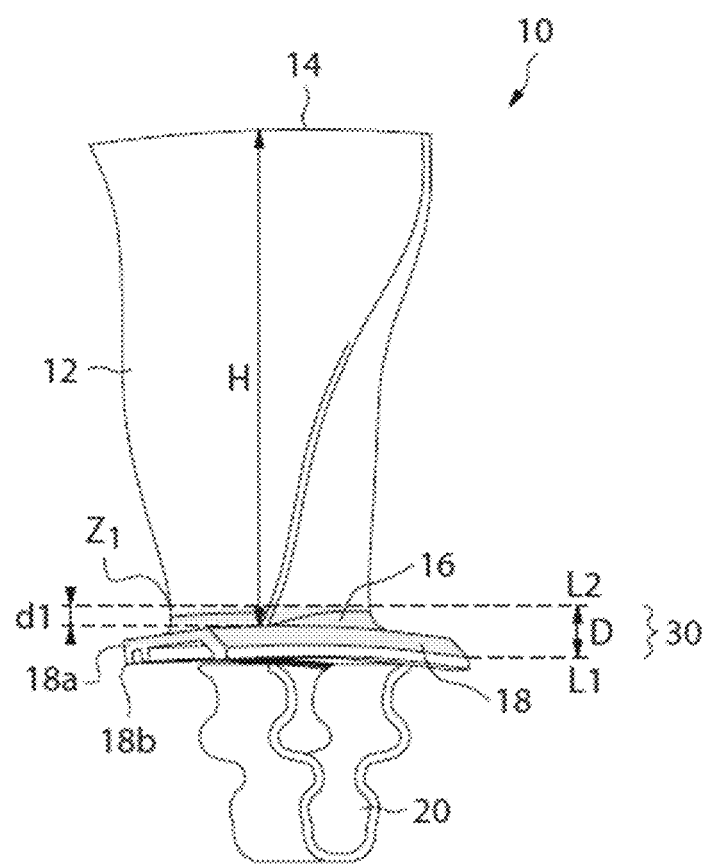
FIG. 1 schematically illustrates a perspective view of a blade according to one embodiment of the disclosure.

FIG. 1 shows very schematically a perspective view of a blade 10 designed to be mounted in a turbine engine (not shown), and particularly an aircraft turbojet. The turbine engine will not be detailed in the remainder of the description.

The blade 10 comprises an aerodynamic airfoil 12 extending radially outwards, an outer radial end or blade tip 14 and an inner radial end 16 or blade root.

The blade 10 further comprises a platform 18 connected to the root 16 of the airfoil and a trunnion 20 being able to engage, for example, in a bore of an element of the turbine engine.

As illustrated, the platform 18 is delimited by an upper end 18a connected to the root 16 of the airfoil and a lower end 18b, radially opposite the upper end 18a and, for example, connected to the trunnion 20.

The maximum radial distance H between the airfoil tip 14 and the platform 18 defines the radial height or the maximum extent of the bearing surface of the airfoil 12.

As illustrated in the figures, the blade 10 is partially covered by a protective strip 30 to combat oxidation and corrosion. The strip 30 covers the blade 10 only at its significantly stressed inner radial end.

The upper radial end of the blade 10 is therefore not covered. Thus, nuisances related to the presence of a coating on the upper radial end of the blade are prevented, particularly in terms of bulk, of increase of stresses, of coating creep, etc., while improving the thermomechanical and fatigue life of the lower radial end of the airfoil.

The protective strip 30 extends between a lower limit L1 and an upper limit L2. The radial distance D between the limits L1, L2 defines the height of the protective strip 30.

Figure 2:
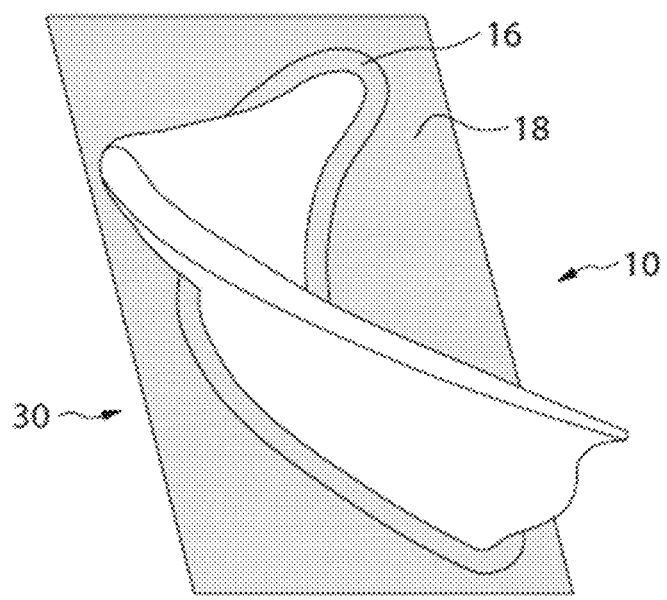
FIG. 2 is a top view of the blade of FIG. 1.

As illustrated in FIGS. 1 and 2, the lower limit L1 is situated on the platform 18, for example at its lower end 18b. Generally, the lower limit L1 is situated on a portion of the platform 18.

The upper limit L2 is situated at the radial inner end 16 of the airfoil 12, for example on the airfoil root.

Figure 3:
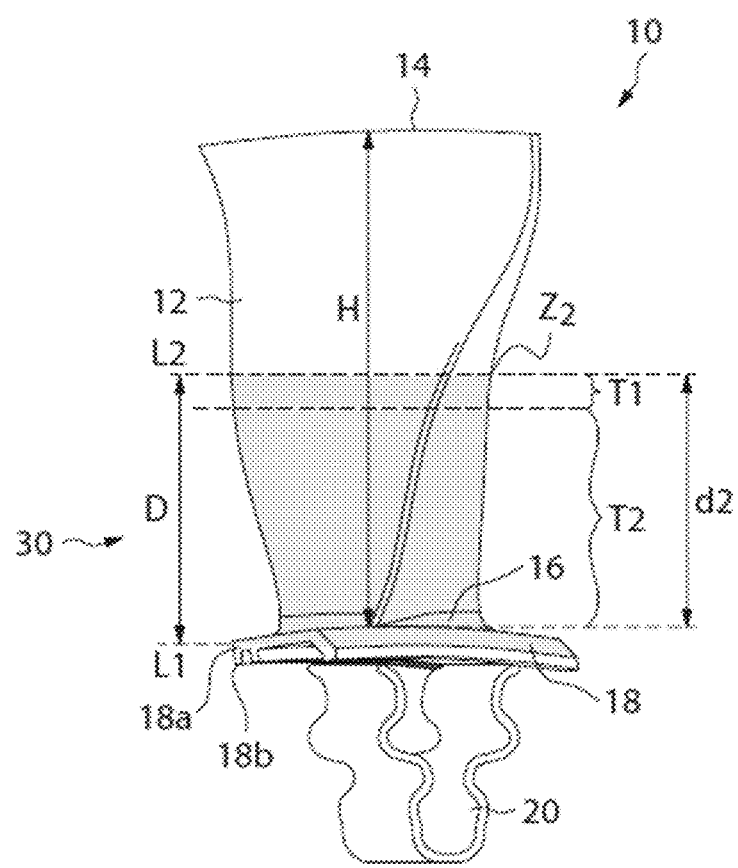
FIG. 3 schematically illustrates a perspective view of a blade according to another embodiment of the disclosure.

Generally, the upper limit L2 is situated between a first radial distance d1, seen in FIG. 1 and a second radial distance d2, seen in FIG. 3.

The first radial distance d1 corresponds to a distance between the connection of the airfoil root 16 to the platform 18 and a first area Z1 situated on the airfoil root 16.

The second radial distance d2 corresponds to a distance between the connection of the airfoil root 16 to the platform 18 and a second area Z2 situated on the airfoil root 16. The second area Z2 corresponds to a so-called "creep limiting" area.

"Creep limiting" area means an area combining a mechanical stress and a thermal level such that the airfoil will degrade (or will age) preferably during creep in this area. This area is conventionally close to the middle of the profile and may be determined, for example, by testing on the component, or by elasto-plastic calculations over the entire airfoil to highlight the areas that would deform the most under the effect of stresses, temperatures and application times of these exposures, or for example, by the Larson-Miller relation linking over the entire airfoil stresses, temperatures and rupture lives for a given material. The creep limiting area is, for example, the area between once and twice the minimum life.

For example, the first radial distance d1 is greater than or equal to 5 mm and the second radial distance d2 is less than or equal to 50% of the maximum extent H of the bearing surface of the airfoil 12, for example less than or equal to 40% of the maximum extent H of the bearing surface of the airfoil 12.

By way of non-limiting example, the protective strip 30 comprises an upper transition area T1, seen in FIG. 3, of variable coating thickness, extending between the portion of airfoil 12 devoid of coating and a lower area T2 of the protective strip 30 of constant coating thickness.

The blade 10 may be made of material based on nickel, cobalt, equiaxed-DS-single crystal and may be obtained by methods of machining from solid, cast, forged or by any other method.

The protective strip 30 may comprise aluminum with or without additives coming from precious metals or rare earths, for example MCrAlY, with M selected from iron, nickel, cobalt, yttrium, or also rare earths or precious metals.

The protective strip 30 may be applied upstream of a deposit of a coating forming a thermal barrier.

Thanks to the protective strip to combat corrosion and oxidation according to the disclosure, the vibration or thermomechanical fatigue lives of blades, and particularly airfoil roots are significantly improved by preventing the risk of crack initiation in the airfoil roots by eliminating surface degradations related to oxidation and to corrosion.

The protective strip covering the blade only at its inner end makes it possible to limit the functional impacts related to adding an anti-oxidation coating.

The invention claimed is:

1. A blade for a turbine engine, comprising:
an aerodynamic airfoil extending radially outwards,
a blade tip,
a blade root, and
a platform connected to the root by an upper end, a maximum radial distance between the blade tip and the platform defining a maximum extent of the bearing surface of the airfoil, wherein the blade is partially covered by a protective strip configured to combat oxidation and corrosion, said strip extending between a lower limit situated on at least one portion of the platform and an upper limit situated on the blade root, the blade tip not being covered with the protective strip or any other coating, wherein the protective strip is made of material selected from the group consisting of aluminum, iron, nickel, cobalt, yttrium, rare earths or precious metals.

2. The blade according to claim 1, wherein the lower limit is situated at a lower end of the platform, radially opposite the upper end.

3. The blade according to claim 1, wherein the upper limit is situated between a first radial distance and a second radial distance, said first radial distance corresponding to a distance between the connection of the blade root to the platform and a first area situated on said root, and said second distance corresponding to a distance between the connection of the blade root to the platform and a second area situated on said root.

4. The blade according to claim 3, wherein the first radial distance is greater than or equal to 5 mm.

5. The blade according to claim 3, wherein the second radial distance is less than or equal to 50% of a maximum extent of the bearing surface of the airfoil.

6. The blade according to claim 1, wherein the protective strip comprises at least one area of constant coating thickness.

7. The blade according to claim 6, wherein the protective strip comprises an upper transition area extending radially between the blade tip not covered with the protective strip or any other coating and the area of the protective strip of constant coating thickness.

8. A turbine engine comprising a plurality of blades according to claim 1.

\* \* \* \* \*